(12) United States Patent
Villani et al.

(10) Patent No.: US 12,542,219 B2
(45) Date of Patent: Feb. 3, 2026

(54) PROCESS AND INSTALLATION FOR THE DESTRUCTION OF RADIOACTIVE SODIUM

(71) Applicant: FRAMATOME, Courbevoie (FR)

(72) Inventors: Dominique Villani, Saint Laurent de Mure (FR); Gérard Deprez, Saint Genis Laval (FR); Olivier Doucet, Lyons (FR)

(73) Assignee: FRAMATOME, Courbevoie (FR)

( * ) Notice: Subject to any disclaimer, the term of this patent is extended or adjusted under 35 U.S.C. 154(b) by 735 days.

(21) Appl. No.: 17/870,792

(22) Filed: Jul. 21, 2022

(65) Prior Publication Data

US 2023/0139794 A1    May 4, 2023

(30) Foreign Application Priority Data

Jul. 22, 2021 (FR) ................................ FR 21 07920

(51) Int. Cl.
| | |
|---|---|
| *B01J 14/00* | (2006.01) |
| *B01J 4/00* | (2006.01) |
| *B01J 19/00* | (2006.01) |
| *G21F 9/22* | (2006.01) |

(52) U.S. Cl.
CPC ................ *G21F 9/22* (2013.01); *B01J 4/008* (2013.01); *B01J 14/00* (2013.01); *B01J 19/002* (2013.01); *B01J 2204/002* (2013.01); *B01J 2219/00263* (2013.01)

(58) Field of Classification Search
CPC . B01J 14/00; B01J 19/002; B01J 4/008; B01J 2204/002; B01J 2219/00263; B01J 2219/00162; G21F 9/22
See application file for complete search history.

(56) References Cited

FOREIGN PATENT DOCUMENTS

| EP | 0245148 A1 | 11/1987 |
| WO | WO9841317 A1 | 9/1998 |

OTHER PUBLICATIONS

Search Report for FR 2107920.

*Primary Examiner* — Lessanework Seifu
(74) *Attorney, Agent, or Firm* — Davidson Kappel LLC

(57) ABSTRACT

A radioactive sodium destruction facility includes a tank for storing liquid metallic sodium, located at a first level; a reaction vessel containing an aqueous solution; a sodium feed circuit comprising a sodium circulation member located at a second level higher than the first level, the circulation member having a suction in fluid communication with the tank and a discharge in fluid communication with the reaction vessel; an inert gas supply unit configured to supply the tank; a controller driving the sodium circulation member; and an inert gas supply unit configured to supply the tank; and a controller driving the supply unit to control a gas pressure in the tank, such that a pressure at the suction of the sodium circulation member is maintained within a predetermined range.

10 Claims, 4 Drawing Sheets

PROCESS AND INSTALLATION FOR THE DESTRUCTION OF RADIOACTIVE SODIUM

The present disclosure relates in general to facilities for the destruction of radioactive metallic sodium, typically from fast breeder nuclear reactors.

BACKGROUND

Such a facility can be arranged as shown in FIG. 1. This facility comprises a storage tank for liquid metallic sodium 3, with a capacity designed for one days operation of the facility at its nominal capacity.

The liquid metallic sodium storage tank 3 receives the sodium to be treated and feeds it into a sodium feed circuit 5 by means of an electromagnetic pump 7.

The sodium feed circuit 5 mainly comprises a charge tank 9 and a dosing pump 11. The dosing pump is placed at a lower level than the charge tank 9, and its suction is fed by gravity from the charge tank 9.

Sodium from the sodium storage tank 3 fills the charge tank 9 up to an overflow 13, which returns the excess sodium to the sodium storage tank 3.

The level of sodium in the charge tank is thus maintained at a substantially constant level, which ensures a constant pressure at the suction of the dosing pump 11.

A sodium filter 15 is interposed on the line 17 connecting the electromagnetic pump to the charge tank 9. It is used to monitor the cleanliness of sodium from the sodium storage tank 3.

The facility 1 further comprises a reaction vessel 19 containing an aqueous soda ash solution. The sodium delivered by the dosing pump 11 is injected from above into the reaction vessel 19 and reacts with a stream of soda ash. The soda ash jet comes from a nozzle 21, placed in the reaction vessel 19, and fed by a recirculation circuit 23. This arrangement ensures a complete reaction of the sodium with the aqueous solution.

The sodium is thus converted into soda ash, with the release of hydrogen gas. The soda ash accumulates in the lower part of the reaction vessel, the hydrogen being discharged to a hydrogen processing circuit 25.

A heat exchanger 27 is interposed on the recirculation circuit 23. It is connected to a cooling unit 29. The heat exchanger 27 allows the thermal energy released by the reaction of the sodium with the aqueous solution to be removed.

In addition, a demineralised water supply line 31 is connected to the recirculation circuit 23. The line 31 allows an adequate amount of demineralised water to be injected into the reaction vessel to keep the molarity of the soda ash inside the reaction vessel substantially constant.

The hydrogen processing circuit 25 is connected to the lid of the reaction vessel 19, and opens into the head of this vessel. It comprises successively a gas scrubber 33, a condenser 35, a heater 37 and a VHE (Very High Efficiency) filter 39. The hydrogen processing circuit, downstream of the VHE filter, is connected to a process ventilation 41.

In the process ventilation 41, the hydrogen from the reaction vessel 19 is diluted in a ventilation shaft (not shown) to a level that excludes the risk of explosion. The hydrogen content in the gas from the reaction vessel is approximately 100%. In the process ventilation, the hydrogen is diluted to about 1% in normal operation. The ventilation shaft in which the dilution is carried out is equipped with instrumentation to confirm the effectiveness of the dilution, by monitoring both the gas flow in the shaft and the hydrogen content.

An inert gas supply 43 is connected to the lid of the reaction vessel 19. This supply is provided to inert the reaction vessel 19 and the hydrogen processing circuit 25, prior to starting the sodium conversion reaction. In the event of a shutdown, this inert gas supply 43 ensures that the hydrogen is removed.

The facility further comprises a liquid effluent treatment unit 45. The unit 45 has a tank for draining and storing the aqueous solution 47. A drain line 49 connects an overflow outlet 51 of the reaction vessel 19 to the drain and storage tank 47. A drain valve 52 is interposed in the drain line 49 immediately downstream of the outlet 51. This separates the hydrogen gas from the soda ash, with the hydrogen gas being returned to the reaction vessel 19.

In addition, the drain line 49 includes a lyre shape 53, forming a siphon which allows the transfer of hydrogen from the head of the reaction vessel 19 to the drain and storage tank 47 to be limited. A liquid plug is formed in the lyre shape, blocking gas transfers between the vessel 19 and the tank 47.

The drain and storage tank 47 is of large capacity. It can store several days of production from the facility 1. It is sized to accommodate, in addition, all the aqueous solution present in the facility, particularly in the reaction vessel 19, in the scrubber 33 and in the various circuits filled with aqueous solution.

The liquid effluent treatment unit 45 further comprises a lift pump 50 and a line 54 for filling the reaction vessel 19 and the drain line 49 with aqueous solution from the discharge and storage tank 47. The lift pump 50 also allows the aqueous solution to be transferred out of the facility.

Such a facility is satisfactory for processing significant quantities of liquid metallic sodium. However, it has the disadvantage of being complex and large, so that the treatment cost is excessively high when the daily flow to be treated is limited.

SUMMARY

In this context, the present disclosure aims to provide a more economical facility, better adapted to a reduced treatment capacity.

To this end, the present disclosure provides a radioactive sodium destruction facility, the facility comprising: a liquid metallic sodium storage tank, located at a first level with respect to the ground; a reaction vessel containing an aqueous solution; a sodium feed circuit, comprising a sodium circulation member located at a second level with respect to the ground higher than the first level, the circulation member having a suction in fluid communication with the sodium storage tank and a discharge in fluid communication with the reaction vessel; an inert gas supply unit, configured to supply the sodium storage tank with inert gas; a controller, driving the inert gas supply unit to control a gas pressure in the sodium storage tank such that a suction pressure of the sodium circulating member is maintained within a predetermined range.

Thus, the circulation member is fed directly from the liquid metallic sodium storage tank, which is located at a lower level than the sodium circulation member. The suction pressure of the sodium circulation member is kept substantially constant by controlling the inert gas pressure inside the sodium storage tank.

This makes it possible to do away with the charge tank, which in the system shown in FIG. 1 was used to supply the suction side of the dosing pump by gravity. As a result, the sodium feed circuit can be considerably simplified and the volume of the facility is reduced. The total cost of the facility is reduced accordingly.

The facility may furthermore exhibit one or more of the following features, taken individually or in any combination that is technically possible:
the predetermined pressure range is [0; 100] mbar rms;
the sodium circulation member is a dosing pump;
the sodium feed circuit comprises a suction line connecting the suction of the sodium circulation member to the sodium storage tank, the suction line being configured to drain entirely by gravity into the sodium storage tank;
the sodium feed circuit comprises a discharge line connecting the discharge of the sodium circulation member to the reaction vessel and a sodium return line fluidly connecting the discharge line to the sodium storage tank, the sodium return line being configured to drain entirely by gravity into the sodium storage tank;
the suction line comprises an end portion oriented to dip into the liquid metallic sodium contained in the sodium storage tank through a free surface of the liquid metallic sodium;
the sodium storage tank has a horizontal axis;
the sodium storage tank is at least partially below ground level;
the sodium storage tank has a storage capacity greater than or equal to a minimum value equal to one day's processing capacity of the facility plus a volume of sodium likely to be contained in the sodium feed circuit.

The present disclosure also provides a method for the destruction of radioactive sodium, typically from a fast neutron reactor, the method comprising the following steps: transferring the liquid metallic sodium to be treated into a liquid metallic sodium storage tank located at a first level with respect to the ground; feeding sodium to a reaction vessel containing an aqueous solution via a sodium feed circuit, the sodium feed circuit comprising a sodium circulating member located at a second level with respect to the ground higher than the first level, the sodium circulating member having a suction in fluid communication with the sodium storage tank and a discharge in fluid communication with the reaction vessel; supplying the sodium storage tank with inert gas; maintaining a pressure at the suction of the sodium circulation member within a predetermined range by controlling a gas pressure in the sodium storage tank.

BRIEF SUMMARY OF THE DRAWINGS

Further features and advantages of the present disclosure will be apparent from the detailed description given below, by way of indication and not in any way limiting, with reference to the appended figures, among which.

DETAILED DESCRIPTION

Figure 2A:
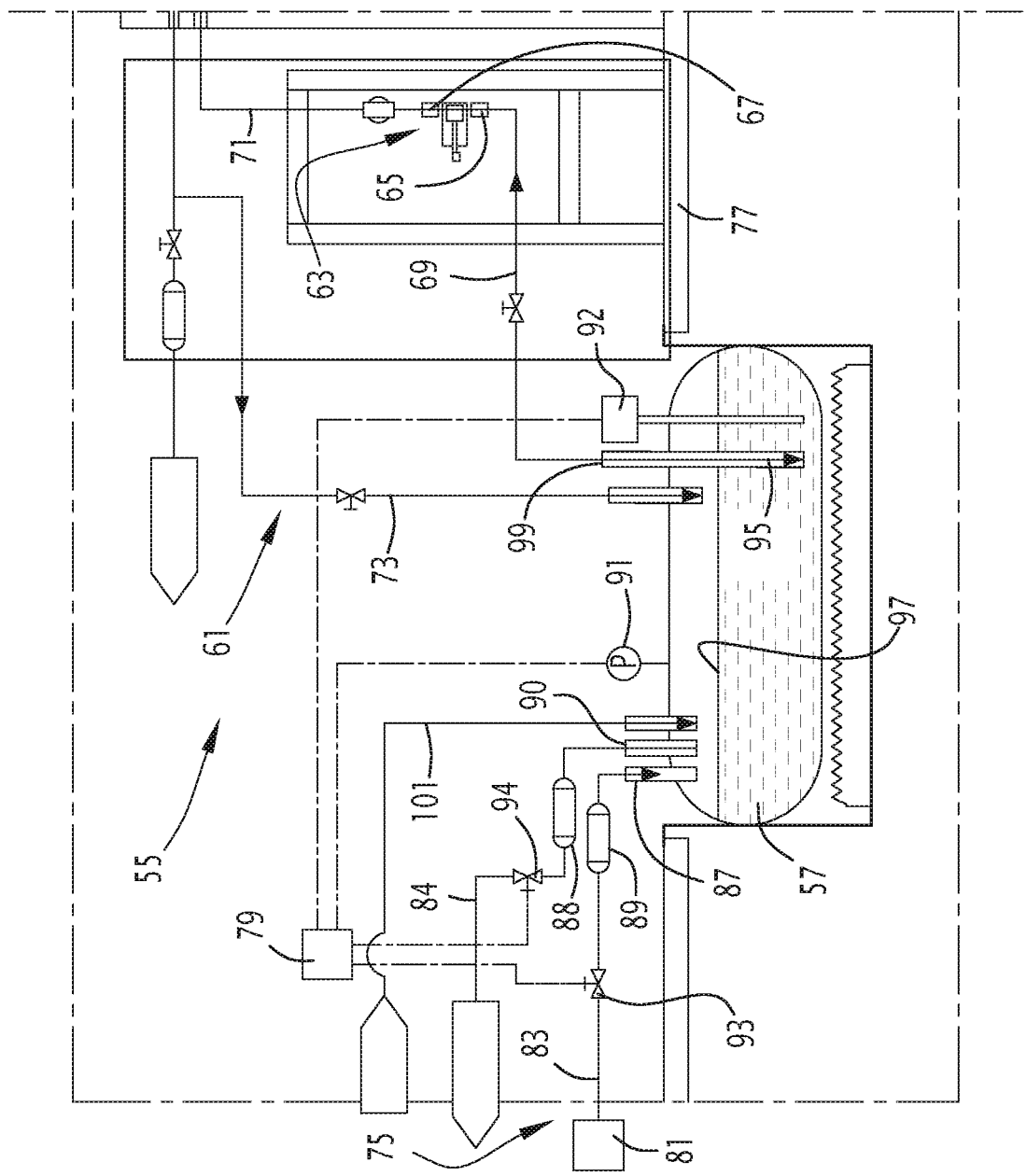
FIG. 2 is a diagram of an embodiment of the sodium destruction facility according to the present disclosure.
Figure 2B:
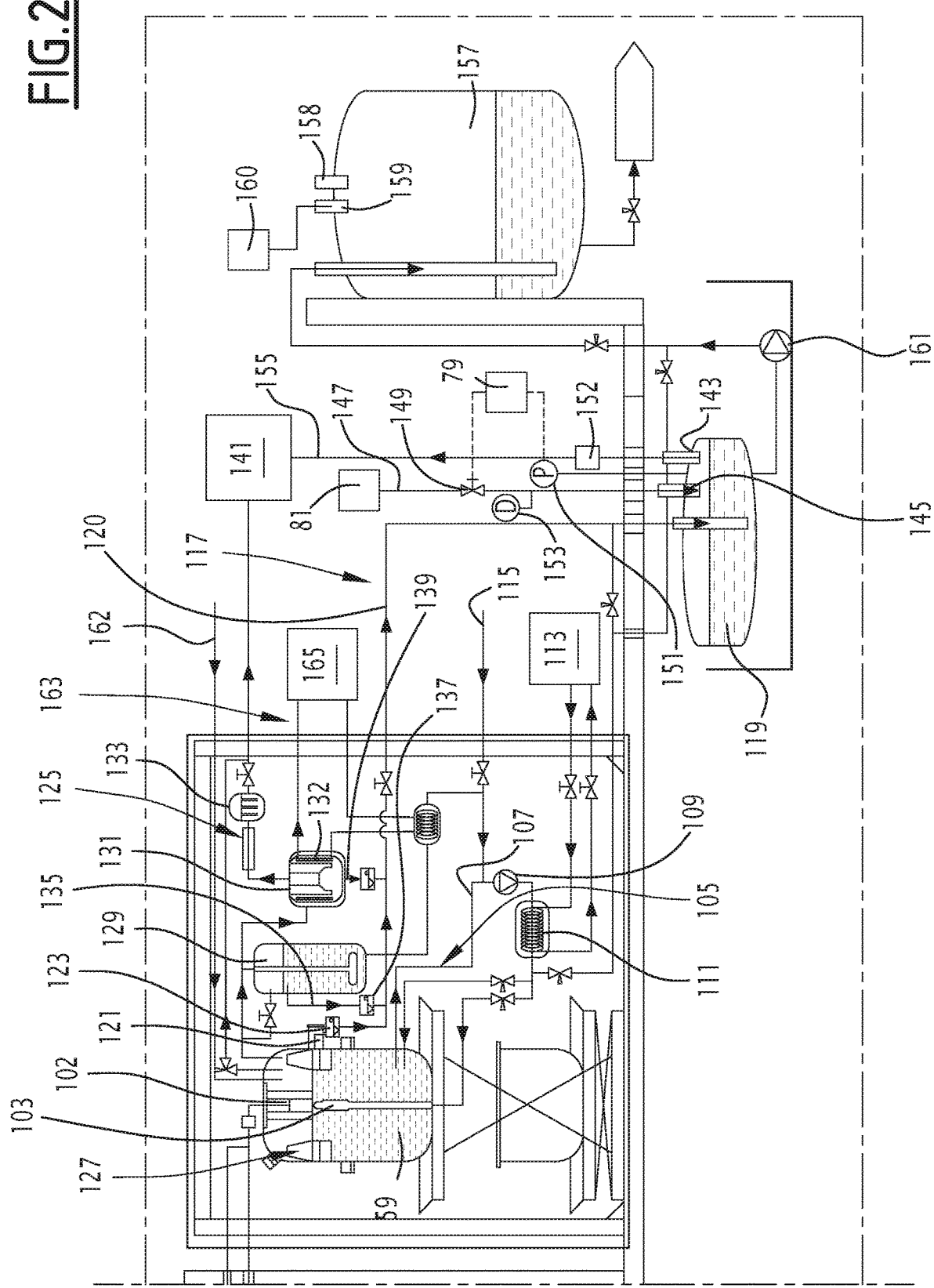

The facility 55 shown in FIG. 2 is designed for the destruction of radioactive sodium, typically from a fast neutron reactor such as Phenix or Super Phenix or from a test loop.

It is intended more specifically to destroy the metallic sodium used as a coolant in fast neutron reactors, by conversion into soda ash.

This facility uses the NOAH process, which was developed by the French Atomic Energy Commission.

The principle of this process is to inject small quantities of liquid sodium into a stream of high flow rate aqueous solution, this operation being carried out inside a sealed tank. Because the reaction is highly exothermic, the aqueous solution is cooled continuously, its temperature being kept at about 40° C.

The reaction of sodium with the water in the aqueous solution produces soda ash and hydrogen. The soda ash is rapidly dispersed in the aqueous solution, without causing a violent reaction. The concentration of soda ash in the reaction vessel is kept substantially constant by injection of demineralised water. This concentration is continuously adjusted to e.g. ten moles/litre.

The hydrogen generated is released into the atmosphere, after dilution and purification.

The facility 55 comprises a storage tank 57 for liquid metallic sodium and a reaction vessel 59 containing an aqueous solution.

The facility 55 further comprises a sodium feed circuit 61, comprising a sodium circulation member 63.

The sodium circulation member 63 is a pump, more precisely a dosing pump.

It is of any suitable type. For example, it is a membrane pump.

The circulation member 63 has a suction 65 in fluid communication with the sodium storage tank 57 and a discharge 67 in fluid communication with the reaction vessel 59.

More specifically, the sodium feed circuit 61 comprises a suction line 69 connecting the suction 65 of the sodium circulation member to the sodium storage tank 57. The circuit 61 further comprises a discharge line 71 connecting the discharge 67 of the sodium circulation member 63 to the reaction vessel 59.

The sodium feed circuit 61 further comprises a sodium return line 73 fluidly connecting the discharge line 71 to the sodium storage tank 57.

The facility 55 further comprises an inert gas supply unit 75, configured to supply the sodium storage tank 57 with an inert gas.

The inert gas is typically nitrogen.

The sodium storage tank 57 is located at a first level above the ground.

As described below, the facility 55 is preferably single-level, with the equipment resting on a floor slab 77. The ground level considered here is, for example, the level of the floor slab 77.

The circulation member 63 is located at a second level above the ground, higher than the first level, i.e. higher than the level of the tank 57.

This means that the suction 65 of the circulation member 63 is located higher than the storage tank 57, and in particular higher than the free surface of the liquid metallic sodium stored in the storage tank 57 when it is filled to its maximum level.

Advantageously, the facility 55 comprises a controller 79, driving the inert gas supply unit 75 to control an inert gas pressure in the sodium storage tank 57, such that a pressure at the suction 65 of the sodium circulation member 63 is maintained within a predetermined range.

Maintaining the suction pressure of the sodium circulation member within a predetermined range helps to ensure that the flow rate of sodium delivered by the circulation member 63 to the reaction vessel 59 is accurately controlled. This is essential to control the reaction of the sodium with the aqueous solution and to prevent the reaction from getting out of control.

The predetermined pressure range is preferably [0, 100] mbar rms and the maximum pressure should not induce siphoning to the reaction vessel when the pump is off.

For this purpose, the inert gas supply unit 75 comprises an inert gas source 81 fluidly connected by an inert gas line 83 to the storage tank 57.

It further comprises a disposal line 84, fluidly connecting the head of the storage tank 57 to a gas treatment unit not shown.

The inert gas source 81 is for example an inert gas distribution network. Alternatively, it is a high-pressure inert gas storage cylinder.

The inert gas source 81 supplies the inert gas to the line 83 at a pressure above the predetermined pressure range, for example 400 mbar rms. This pressure typically corresponds to the suction pressure of the dosing pump 63, plus the head between the sodium level in the tank 57 and the suction 65 of the circulation member 63.

The inert gas supply line 83 is connected to a spigot 87 carried by the upper part of the storage tank 57 and opening into the tank head. A sodium vapour trap 89 is installed on line 83.

The disposal line 84 is connected to a spigot 90 carried by the upper part of the storage tank 57 and opening into the tank head. A sodium vapour trap 88 is installed on line 84. The gas treatment unit allows the gases from tank 57 to be released into the environment after purification.

The inert gas supply unit 75 includes a gauge 91 measuring the gas pressure in the headspace of the storage tank 57. This gauge is of any suitable type. The pressure measurement 91 informs the controller 79 and transmits the measured pressure values to it.

The sodium storage tank 57 is advantageously equipped with a sodium level gauge 92. This gauge is of any suitable type. The sodium level gauge 92 informs the controller 79 and transmits the measured pressure values to it.

In addition, the inert gas supply line 83 includes a control member 93, driven by the controller 79. The control unit 93 is interposed on the line 83, and controls the flow of inert gas delivered to the storage tank 57 by the line 83. Similarly, a control unit 94, driven by the controller 79, is interposed on the disposal line 84.

For example, the control members 93 and 94 are controlled valves.

The control members 93 and 94 are driven by the controller 79 using the gas pressure measurement 91 in the headspace of the storage tank 57 and possibly the sodium level gauge 92.

Specifically, the controller 79 drives the control members 93 and 94 to maintain the gas pressure in the tank head within a specified gas pressure range.

The controller 79 selects this gas pressure range as being equal to the pressure range at the suction of the circulation member plus the head between the sodium level in the tank 57 and the suction of the circulation member 63.

If the sodium level in the tank is essentially constant or changes slightly, the controller 79 will assume an essentially constant head to determine the gas pressure range.

Otherwise, the controller 79 uses the sodium level gauge 92 to determine the head between the sodium level in the tank 57 and the suction of the circulation member 63.

Indeed, the head between the level of sodium in the tank 57 and the suction of the circulation member 63 varies with the level of sodium in the tank 57.

The sodium storage tank 57 is inert gas-tight and all the lines leading into the head of the tank 57 are equipped with a shut-off device to prevent leakage of inert gas into these lines when the circulation member 63 is in operation.

Advantageously, the suction line 69 is configured to empty entirely by gravity into the sodium storage tank 57.

In other words, the feed line 69 does not have a siphon, or U-shaped portion, in which the liquid metallic sodium could stagnate when the circulation member 63 is stopped.

On the contrary, when the circulation member 63 is stopped, all the sodium contained in the line 69 returns by gravity to the storage tank 57.

Likewise, the return line 73 is configured to empty entirely by gravity into the sodium storage tank 57.

In particular, the suction line 69 comprises an end portion 95 oriented to dip into the liquid metallic sodium contained in the sodium storage tank 57 through a free surface 97 of the liquid metallic sodium.

In other words, the end portion 95 of the suction line is a spigot 99 connected to the top of the tank 57 and dipping into the liquid metallic sodium. This spigot 99 is typically substantially vertical.

The liquid metallic sodium therefore exits to the circulation member 63 from the top of the storage tank 57 and not from the bottom, which helps to reduce the risk of the tank leaking.

The facility 55 further comprises a line 101 for filling the storage tank 57 with sodium.

This line 101 is connected to a large capacity storage containing the liquid metallic sodium stock to be destroyed or to a small capacity-draining facility.

Typically, the sodium storage tank 57 has a storage capacity greater than or equal to a minimum value equal to one day's processing capacity of the facility plus the volume of sodium likely to be contained in the feed circuit 61.

The sodium storage tank 57 preferably has a storage capacity less than or equal to two days' processing capacity of the facility.

Advantageously, the sodium storage tank 57 is at least partially located below ground level, which helps to reduce the overall height of the facility 55.

The sodium storage tank 57 is a horizontal axis tank, typically a cylindrical horizontal axis tank.

For example, it has an axial length of around 2.5 m and a cross-section perpendicular to its axis of around 0.5 m$^2$.

Placing such a tank with its axis horizontal is more advantageous than placing the same tank with its axis vertical.

Indeed, when a given volume of sodium is drawn from this tank, the difference in level is less if the tank is arranged with its axis horizontal than if it is arranged with its axis vertical.

In other words, the cross-sectional area of the tank, taken perpendicular to the vertical direction, is larger when the tank has its horizontal axis than when it has its vertical axis, as long as the volume of stored liquid sodium is greater than a minimum volume.

This helps to achieve a substantially constant pressure at the suction of the circulation member 63.

The reaction vessel 59 comprises a sodium injection nozzle 102, configured to eject sodium downwards. This nozzle is connected to the discharge line 71.

The aqueous solution in the reaction vessel 59 is typically soda ash.

The reaction vessel 59 has an aqueous solution ejection nozzle 103, positioned substantially below the sodium injection nozzle 102. The aqueous solution ejection nozzle 103 ejects the aqueous solution upwards, so that the jet of aqueous solution meets the sodium injected by the sodium injection nozzle 102.

The nozzle 103 is fed by a recirculation and cooling circuit 105. The circuit 105 comprises a conduit 107, an upstream end of which is stitched to a side wall of the reaction vessel 59. The downstream end of the conduit 107 is connected to the nozzle 103. The circuit 105 further comprises a recirculation pump 109 delivering the aqueous solution to the nozzle 103.

The circuit 105 further comprises a heat exchanger 111, one side of which is interposed on the conduit 107. The other side is connected to a cooling unit 113, thus allowing the aqueous solution circulating in the recirculation and cooling circuit 105 to be cooled.

A demineralised water supply line 115 is connected to the conduit 107. It is connected to a demineralised water distribution network or to a demineralised water reserve. It allows the aqueous solution in the reaction vessel 59 to be diluted so as to maintain the concentration of the soda ash at a predetermined value. The demineralised water supplied by the line 115 is injected into the conduit 107 and mixed with the aqueous solution circulating in the recirculation and cooling circuit 105.

The facility 55 further comprises a liquid effluent treatment unit 117, with a drain tank 119 and a drain line 120 fluidly connecting an aqueous solution outlet 121 from the reaction vessel 59 to the tank 119.

The aqueous solution outlet 121 is typically by overflow.

In other words, the drain line 120 is connected to an overflow of the reaction vessel 59, the aqueous solution in the reaction vessel 59 flowing through the overflow into the line 120 when the level of aqueous solution in the reaction vessel exceeds the level of the overflow A drain 123 is interposed along the drain line 120, immediately downstream of the outlet 121.

Advantageously, the drain line 120 is configured to empty entirely by gravity into the drain tank 119.

In other words, there is no lyre shape or siphon along the drain line 120 in which a plug of aqueous solution could build up.

The facility 55 further comprises a hydrogen processing circuit 125, connected to the reaction vessel 59.

The hydrogen processing circuit 125 comprises a hydrogen filter 127, placed inside the reaction vessel 59.

The hydrogen processing circuit 125 further comprises a gas scrubber 129. A gas inlet of the gas scrubber 129 is fluidly connected to the hydrogen filter 127.

The hydrogen processing circuit 125 further comprises a condenser 131, located downstream of the gas scrubber 129. A gas outlet of the scrubber 129 is connected to a gas inlet of the condenser 131. The condenser 131 is equipped with a coil 132, in which chilled water circulates.

The hydrogen processing circuit 125 comprises a VHE (Very High Efficiency) filter 133, placed downstream of the condenser 131. A gas outlet of the condenser 131 is connected to a gas inlet of the VHE filter 133.

The scrubber 129 contains a volume of aqueous solution. The scrubber 129 comprises an overflow aqueous solution outlet connected to the drain line 120 by an outlet line 135 with a drain valve 137 interposed.

The condenser 131 has an outlet for the aqueous solution at the bottom, connected by an outlet line 139 to the drain line 120. A drain valve is interposed on the outlet line 139.

The facility 55 further comprises a gas treatment unit 141, configured to dilute the gases and release the diluted gases to the atmosphere. One outlet of the VHE filter is connected to the gas treatment unit 141.

The gas treatment unit 141 comprises a duct (not shown) in which the gases from the hydrogen processing circuit 125 are diluted so that the hydrogen content in the diluted gas is below a predetermined level that excludes any risk of explosion.

In practice, the gases from the hydrogen processing circuit 125 contain, during the operation of the facility, approximately 100% hydrogen. In the gas treatment unit 141, these gases are diluted to a hydrogen content of approximately 1%.

Due to the absence of a lyre shape in the drain line 120, it is possible for hydrogen to flow out of the reaction vessel 59 through the aqueous solution outlet 121 and into the drain tank 119.

Advantageously, the drain tank 119 has a gas outlet 143 fluidly connected to the gas treatment unit 141 by a line 155.

The gas outlet 143 is provided in the upper part of the tank 119 and opens into the headspace of the tank 119.

Furthermore, the inert gas supply unit 75 is configured to supply inert gas to the drain tank 119.

The facility comprises a control member 152 configured to maintain an inert gas pressure in the drain tank 119 above a predetermined minimum.

The control member 152 is a spillway located on the line 155 to keep the headspace of the tank 119 at an inert gas pressure.

The spillway 152 is a fitting that regulates the pressure of the fluid upstream of the spillway. In other words, the spillway is a restriction controlled by the upstream pressure level.

The spillway 152 is calibrated to maintain a pressure in the tank 119 above a minimum. This minimum is between 10 and 100 mbar rms, preferably between 20 and 60 mbar rms and is for example 40 mbar rms.

Furthermore, the controller 79 is configured to drive the inert gas supply unit 75 to provide a flow of inert gas into the tank 119, with an inert gas flow rate within a predetermined range.

For this purpose, the drain tank 119 has an inert gas inlet 145 at the top of the tank. This inlet 145 is connected to the source of inert gas 81 by a line 147 on which is interposed a regulator 149.

The regulator 149 controls the flow of inert gas delivered to the drain tank 119 through the line 147. It is driven by the controller 79.

The control member 149 is for example an adjustable valve.

In addition, the drain tank 119 is equipped with a gas pressure gauge 151. The gauge 151 provides the measured pressure values to the controller 79.

Furthermore, the liquid effluent treatment unit 117 is preferably equipped with a flow meter 153 configured to measure the flow of gas circulating in the headspace of the tank 119.

The controller 79 drives the control unit 149 according to the flow values measured by the flow meter 153, so as to maintain the gas flow within a predetermined range.

The predetermined gas flow range is for example [0.1; 10] Nm3/h, preferably [0.2; 5] Nm3/h, even more preferably [0.5; 1] Nm3/h.

The controller 79 is preferably programmed to match the gas flow to the soda ash transfer rate to the soda ash storage tank 157, which will be described later. The gas flow rate is thus increased to maintain the pressure in the tank head by compensating for the increase in gas volume caused by the soda ash transfer.

In the variant shown in FIG. 2, the flow meter is located on line 147. In this case, the controller 79 is programmed to drive the control member 149 not only using the measurement provided by the flow meter 153 but also using the pressure gauge 151.

For example, the degree of openness O of the control member 149 is determined using the following equation:

$$O=K1*(P_{mes}-P_{ref})+K2*(Q_{mes}-Q_{ref})+K3$$

Where K1, K2 and K3 are predetermined constants, $P_{ref}$ is a reference value for the gas pressure in the tank 119, $Q_{ref}$ is a reference value for the gas flow rate into the tank 119, $P_{mes}$ is the value provided by the gas pressure gauge 151, $Q_{mes}$ is the value provided by the flow meter 153.

Alternatively, the flow meter 153 is arranged to measure the gas flow in the line 155 connecting the gas outlet 143 of the tank to the gas treatment unit 141.

In this configuration, the controller 79 drives the control unit 149 using the measurement provided by the value provided by the flow meter 153, without using the measurement from the pressure gauge 151.

Thus, the head of the draining tank is filled with inert gas.

Hydrogen from the reaction vessel 59 flowing into the drain tank 119 via the drain line 120 in an incidental situation cannot cause an explosion.

It is continuously discharged to the gas treatment unit 141. This is achieved by the drain tank 119 being connected to the inert gas supply unit 75. This unit maintains a continuous overpressure of inert gas in the drain tank 119 and provides a continuous flow of inert gas into the tank head.

Keeping the drain tank 119 pressurised helps to reduce the risk of air entering the tank.

The drain tank 119 has a storage capacity of between:
a minimum volume equal to a nominal volume of aqueous solution contained in the reaction vessel 59, plus a nominal volume of aqueous solution contained in the gas scrubber 129; and
a maximum volume equal to the production of soda ash over a period of 6 hours.

In other words, the drain tank 119 is sized to receive the volume of aqueous solution contained in the reaction vessel 59, and the volume of aqueous solution contained in the recirculation and cooling circuit 105, in the drain line 120 and in the hydrogen processing circuit 125. However, it is not designed to store the volume of aqueous solution resulting from the operation of the facility 55 for a significant period of time, for example one day.

For this purpose, the facility 55 comprises an aqueous solution storage tank 157, with a storage capacity greater than one day's production of the facility at nominal treatment capacity.

For example, the aqueous solution storage tank 157 has a storage capacity of one week's production at nominal treatment capacity.

If necessary, the facility comprises several storage tanks for aqueous solution.

For example, the drain tank 119 has a storage capacity of the order of 1 m³ of aqueous solution. The facility 55 also has three storage tanks for aqueous solution 157, each with a volume of 30 m³.

The storage tank 157 has an air inlet 158, through which the ceiling of the storage tank 157 communicates with the atmosphere of the room where the tank 157 is located. The storage tank 157 also has a gas outlet 159 opening into the roof of the tank 157. This gas outlet 159 is connected to the ventilation system 160 of the building. This ventilation system is of the conventional type. It is different from the gas treatment unit 141 to which the hydrogen-containing process gases are directed.

The drain tank 119 is at least partially below ground level. The or each aqueous solution storage tank 157 is instead located above ground level.

The facility 55 further comprises a transfer member 161 having a suction fluidly connected to the drain tank 119 and a discharge fluidly connected to the aqueous solution storage tank 157.

The use of a small capacity drain tank, at least partially buried, and a large capacity aqueous solution storage tank, located above ground, helps to reduce the overall height of the facility.

It is then possible to arrange the facility 55 on one level.

Figure 1:
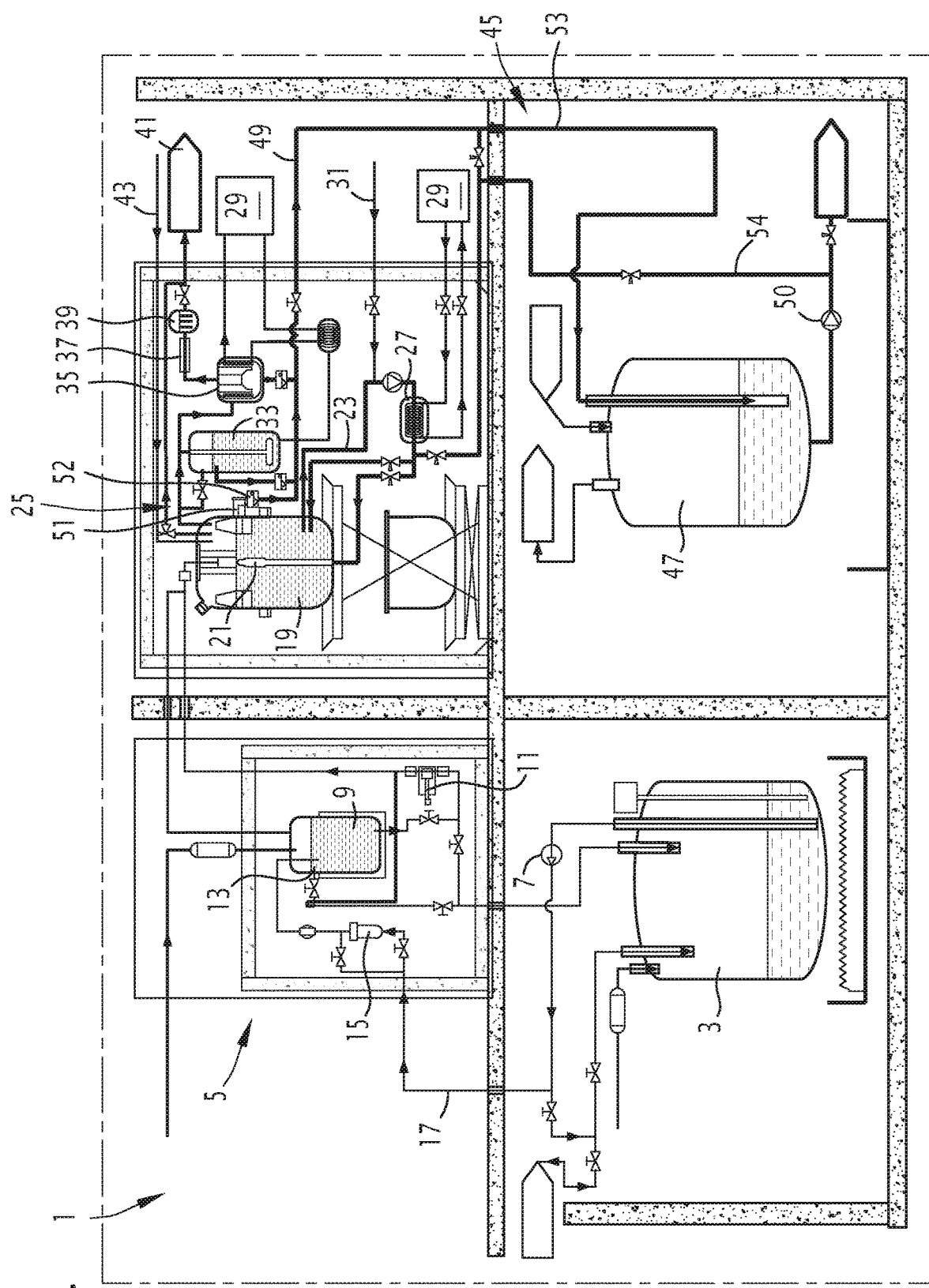
FIG. 1 is a diagram of an example sodium destruction facility not according to the present disclosure.

In the facility shown in FIG. 1, the equipment is arranged on two levels. The sodium storage tank 3 and the aqueous solution drain and storage tank 47 are located at ground level, with the reaction vessel 19 located at a higher level.

As a result, the cost of the civil engineering for the sodium destruction facility 55 in FIG. 2 is reduced.

The inert gas supply unit 75 has a line 162 connected to the head of the reaction vessel 59. This line is designed to inert the reaction vessel and the hydrogen processing circuit before the facility starts up.

The facility 55 further comprises a circuit 163 supplying the coil 132 with chilled water. The circuit 163 is connected to a chiller 165.

A variant of the facility 55 will now be described with reference to FIG. 3. Only the points in which the facility in FIG. 3 differs from the facility in FIG. 2 will be detailed below.

Elements that are identical or perform the same function will be designated by the same references.

Figure 3:
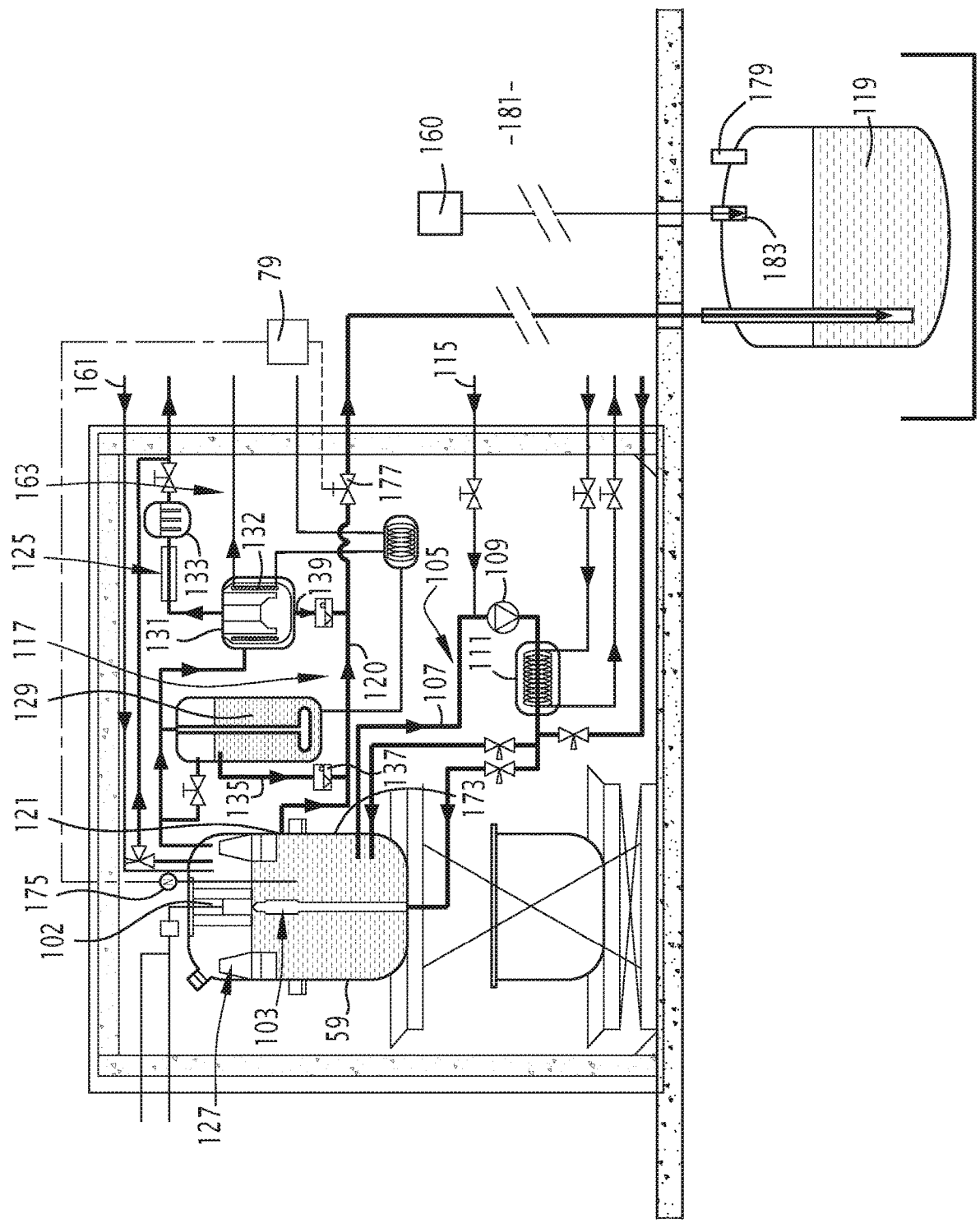
FIG. 3 is an enlarged depiction of a detail of FIG. 2, for a variant embodiment of the sodium destruction facility.

In the embodiment shown in FIG. 3, the aqueous solution outlet 121 of the reaction vessel 59 is not an overflow outlet. The aqueous solution outlet 121 is flooded and opens below a nominal level of aqueous solution in the reaction vessel 59.

Typically, the aqueous solution outlet 121 is a spigot, provided in a side wall 173 of the reaction vessel 59, below the nominal level of aqueous solution.

In this case, the reaction vessel 59 advantageously comprises an aqueous solution level gauge 175. This level gauge is of any suitable type. It measures the level of aqueous solution in the reaction vessel 59. It transmits the measured values to the controller 79.

The drain line 120 further comprises a regulating shut-off member 177.

The shut-off member 177 is interposed on the drain line 120, and allows the passage cross-section offered to the aqueous solution flowing in the drain line 120 to be modulated.

The shut-off member 177 is for example an adjustable valve.

The controller 79 controls the valve 177 using the level values measured by the level gauge 175. The controller 79 controls the valve 177 to maintain the level of aqueous solution in the reaction vessel 59 within a predetermined range.

When the aqueous solution level is within the predetermined range, the aqueous solution outlet 121 is flooded.

Therefore, it is not necessary to connect the drain tank 119 to the inert gas supply unit 75. It is also not necessary to connect the drain tank 119 to the gas treatment unit 141.

Indeed, because the outlet 121 is constantly flooded, there is no hydrogen flowing from the reaction vessel 59 to the drain tank 119 through the drain line 120.

In contrast, the discharge tank 119 has a gas inlet 179 that puts the headspace of the storage tank 119 in fluid communication with the atmosphere 181 of the room in which the tank 119 is located.

The drain tank 119 also has a gas outlet 183 which connects the tank 119 to the building ventilation 160.

According to a second aspect, the present disclosure relates to a method for the destruction of radioactive sodium, typically from a fast neutron reactor.

This method is especially suitable for the facility 55 described above.

Conversely, the facility 55 is specially designed to implement the method that will be described.

The method comprises the following steps:
Transferring the liquid metallic sodium to be treated to a liquid metallic sodium storage tank 57 located at a first level above ground.
Feeding sodium to a reaction vessel 59 containing an aqueous solution, via a sodium feed circuit 61, the sodium feed circuit 61 comprising a sodium circulation member 63 located at a second level above ground level higher than the first level, the circulation member 63 having a suction 65 in fluid communication with the sodium storage tank 57 and a discharge 67 in fluid communication with the reaction vessel 59;
Supplying the sodium storage tank 57 with an inert gas;
Maintaining a pressure at the suction 65 of the sodium circulation member 63 within a predetermined range by controlling a gas pressure in the sodium storage tank 57.

The sodium storage tank 57 is as described above.
The reaction vessel 59 is as described above.
The sodium feed circuit 61 is as described above.
The sodium storage tank 57 is supplied with inert gas through a supply unit 75 as described above.

The suction pressure of the sodium circulation member 63 is controlled within a range of 0 to 100 mbar effective.

The method, according to a further aspect independent of the first, comprises the following steps:
Supplying liquid metallic sodium to a reaction vessel 59 containing an aqueous solution, the reaction vessel 59 having a flooded aqueous solution outlet 121 opening below a nominal level of aqueous solution in the reaction vessel 59;
Collecting the aqueous solution from the reaction vessel 59 in a drain tank 119, the aqueous solution flowing through a drain line 120 from the aqueous solution outlet 121 to the drain tank 119, the drain line comprising a regulating shut-off member 177;
Controlling the shut-off member 177 to maintain the level of aqueous solution in the reaction vessel 59 within a predetermined range.

The reaction vessel 59 is as described above.
The aqueous solution outlet 121 is as described above with reference to FIG. 3.
The reaction vessel 59 is supplied with liquid metallic sodium from a storage tank 57 via a supply circuit 61. The tank 57 and the supply circuit 61 are advantageously as described above with reference to FIG. 2.
The drain tank 119 is as described above with reference to FIG. 3. The drain line 120 is as described above with reference to FIG. 3.
The regulating shut-off member 177 is as described above with reference to FIG. 3.

It is driven by the controller 79 using measurements taken by an aqueous solution level gauge 175 in the reaction vessel 59.

The predetermined range is chosen so that when the level of aqueous solution remains within the range, the aqueous solution outlet 121 is constantly flooded.

The method of sodium destruction, according to a third aspect independent of the first and second aspects, comprises the following steps:
Supplying liquid metallic sodium to a reaction vessel 59 containing an aqueous solution, the reaction vessel having an aqueous solution outlet 121;
Collecting the aqueous solution from the reaction vessel 59 in a drain tank 119, the aqueous solution flowing through a drain line 120 from the aqueous solution outlet 121 to the drain tank 119;
Supplying inert gas to the drain tank 119;
Diluting the gases from the discharge tank 119 and releasing the diluted gases into the atmosphere.

The reaction vessel 59 is as described above with reference to FIG. 2.

The aqueous solution outlet 121 is by overflow, or in other words by spillage. This outlet has been described above with reference to FIG. 2.

The drain tank 119 is as described above with reference to FIG. 2. The drain line 120 is as described above with reference to FIG. 2.

The drain tank 119 is supplied with inert gas as described above.

The gases from the discharge tank 119 are directed to a gas treatment unit 141, of the type described above.

The gases from the drain tank 119 are likely to contain hydrogen, as the drain tank 119 is connected to an overflow liquid outlet from the reaction vessel 59. In the gas treatment unit 141, the gases from the discharge tank 119 are diluted with a dilution ratio that ensures that the hydrogen content after dilution excludes any risk of explosion.

What is claimed is:

1. A facility for destruction of radioactive sodium comprising:
    a liquid metallic sodium storage tank located at a first level with respect to the ground;
    a reaction vessel containing an aqueous solution;
    a sodium feed circuit comprising a sodium circulation member located at a second level relative to the ground higher than the first level, the sodium circulation member having a suction in fluid communication with the liquid metallic sodium storage tank and a discharge in fluid communication with the reaction vessel;
    an inert gas supply unit configured to supply the liquid metallic sodium storage tank with inert gas;
    a controller driving the inert gas supply unit to control a gas pressure in the liquid metallic sodium storage tank such that a suction pressure of the sodium circulation member is maintained within a predetermined range.

2. The facility according to claim 1, wherein the predetermined range is [0; 100] mbar effective.

3. The facility according to claim 1, wherein the sodium circulation member is a dosing pump.

4. The facility according to claim 1, wherein the sodium feed circuit comprises a suction line connecting the suction of the sodium circulation member to the liquid metallic sodium storage tank, the suction line being configured to drain entirely by gravity into the liquid metallic sodium storage tank.

5. The facility according to claim 4, wherein the sodium feed circuit comprises a discharge line connecting the discharge of the sodium circulation member to the reaction vessel and a sodium return line fluidly connecting the discharge line to the liquid metallic sodium storage tank, the sodium return line being configured to drain entirely by gravity into the liquid metallic sodium storage tank.

6. The facility according to claim 4, wherein the suction line comprises an end portion oriented to dip into a liquid metallic sodium contained in the liquid metallic sodium storage tank through a free surface of the liquid metallic sodium.

7. The facility according to claim 1, wherein the liquid metallic sodium storage tank is of a horizontal axis.

8. The facility according to claim 1, wherein the liquid metallic sodium storage tank is at least partially located below a ground level.

9. The facility according to claim 1, wherein the liquid metallic sodium storage tank has a storage capacity greater than or equal to a minimum value equal to one day's processing capacity of the facility plus a volume of sodium likely to be contained in the sodium feed circuit.

10. A method of destroying radioactive sodium in the facility as recited in claim 1, the method comprising:
- supplying the sodium storage tank with inert gas by the inert gas supply unit; and
- maintaining the suction pressure of the sodium circulation member within a predetermined range by controlling a gas pressure in the sodium storage tank by the controller driving the inert gas supply unit.

* * * * *